(12) United States Patent
Broughton et al.

(10) Patent No.: US 11,310,072 B2
(45) Date of Patent: Apr. 19, 2022

(54) BUS TRANSCEIVER WITH RING SUPPRESSION

(71) Applicant: TEXAS INSTRUMENTS INCORPORATED, Dallas, TX (US)

(72) Inventors: Richard Sterling Broughton, Dallas, TX (US); Vijayalakshmi Devarajan, Plano, TX (US); Wesley Ryan Ray, Frisco, TX (US); Dushmantha Bandara Rajapaksha, Lucas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/063,450

(22) Filed: Oct. 5, 2020

(65) Prior Publication Data
US 2021/0167989 A1 Jun. 3, 2021

Related U.S. Application Data

(60) Provisional application No. 62/942,763, filed on Dec. 3, 2019.

(51) Int. Cl.
*H04L 12/40* (2006.01)
*H04M 3/02* (2006.01)

(52) U.S. Cl.
CPC ........ *H04L 12/40013* (2013.01); *H04M 3/02* (2013.01); *H04L 2012/40215* (2013.01)

(58) Field of Classification Search
CPC ............... H04L 12/40; H04L 12/40006; H04L 12/40013; H04L 12/40026; H04L 12/40039; H04L 2012/40; H04L 2012/40208; H04L 2012/40215; H04L 25/0272; H04M 3/02

See application file for complete search history.

(56) References Cited

U.S. PATENT DOCUMENTS

| | | | |
|---|---|---|---|
| 7,924,055 B2 | 4/2011 | Jang | |
| 10,020,841 B2* | 7/2018 | De Haas | H04L 25/0278 |
| 10,042,807 B2* | 8/2018 | Hinderer | G06F 13/4282 |
| 10,452,504 B2* | 10/2019 | Elend | H04L 12/4135 |
| 2006/0170451 A1 | 8/2006 | Jordanger et al. | |
| 2014/0156893 A1* | 6/2014 | Monroe | G06F 13/3625 710/117 |
| 2019/0058614 A1* | 2/2019 | de Haas | H04L 69/18 |

OTHER PUBLICATIONS

International Search Report in corresponding PCT Application No. PCT/US2020/062568, dated Mar. 11, 2021 (2 pages).

* cited by examiner

*Primary Examiner* — Siu M Lee
(74) *Attorney, Agent, or Firm* — John R. Pessetto; Charles A. Brill; Frank D. Cimino

(57) ABSTRACT

A transceiver includes a driver stage and a transient-triggered ring suppression circuit. The driver stage has a first transistor coupled between a supply voltage terminal and a first bus terminal and a second transistor coupled between a ground and a second bus terminal. The transient-triggered ring suppression circuit is coupled to the first and second transistors. The transient-triggered ring suppression circuit is configured to be enabled upon transition of the transceiver from a dominant state to a recessive state. Further, while the transceiver is in the recessive state, the transient-triggered ring suppression circuit is configured to attenuate ringing on at least one of the first or second bus terminals.

18 Claims, 3 Drawing Sheets

BUS TRANSCEIVER WITH RING SUPPRESSION

CROSS REFERENCE TO RELATED APPLICATION

This application claims priority to U.S. Provisional Application 62/942,763, filed Dec. 3, 2019, titled "Circuit Technique to Absorb RF Energy and Improve Immunity in CAN Transceivers," which is hereby incorporated by reference in its entirety.

BACKGROUND

The controller area network (CAN) is a bus standard designed to allow microcontrollers and devices to communicate with one another in applications without a host computer. The CAN bus protocol is a message-based protocol, particularly suitable for multiplexed electrical wiring within automobiles but has usefulness in other applications.

SUMMARY

In one example, a transceiver includes a driver stage and a transient-triggered ring suppression circuit. The driver stage has a first transistor coupled between a supply voltage terminal and a first bus terminal and a second transistor coupled between a ground and a second bus terminal. The transient-triggered ring suppression circuit is coupled to the first and second transistors. The transient-triggered ring suppression circuit is configured to be enabled upon transition of the transceiver from a dominant state to a recessive state. Further, while the transceiver is in the recessive state, the transient-triggered ring suppression circuit is configured to attenuate ringing on at least one of the first or second bus terminals.

BRIEF DESCRIPTION OF THE DRAWINGS

For a detailed description of various examples, reference will now be made to the accompanying drawings in which.

DETAILED DESCRIPTION

As CAN bus speeds have increased, ringing on the bus due to improper electrical termination has also increased. As a CAN bus transceiver transitions from a "dominant" state to a "recessive" state, reflections from improperly terminated stubs may cause ringing on the transceiver. If the magnitude of the ringing is high enough, a transceiver will misinterpret the ring as a dominant bit. As such, ringing can cause bit errors. The examples described herein include a CAN bus transceiver that includes a transient-triggered ring suppression circuit which is enabled upon transition of the transceiver to the recessive state. Any ringing on the bus is attenuated through the transient-triggered ring suppression circuit thereby resulting in a smaller amplitude and shorter duration ringing signal thereby resulting in fewer bit errors. The transient-triggered ring suppression circuit described herein may have applicability to other bus protocols besides CAN.

Figure 1:
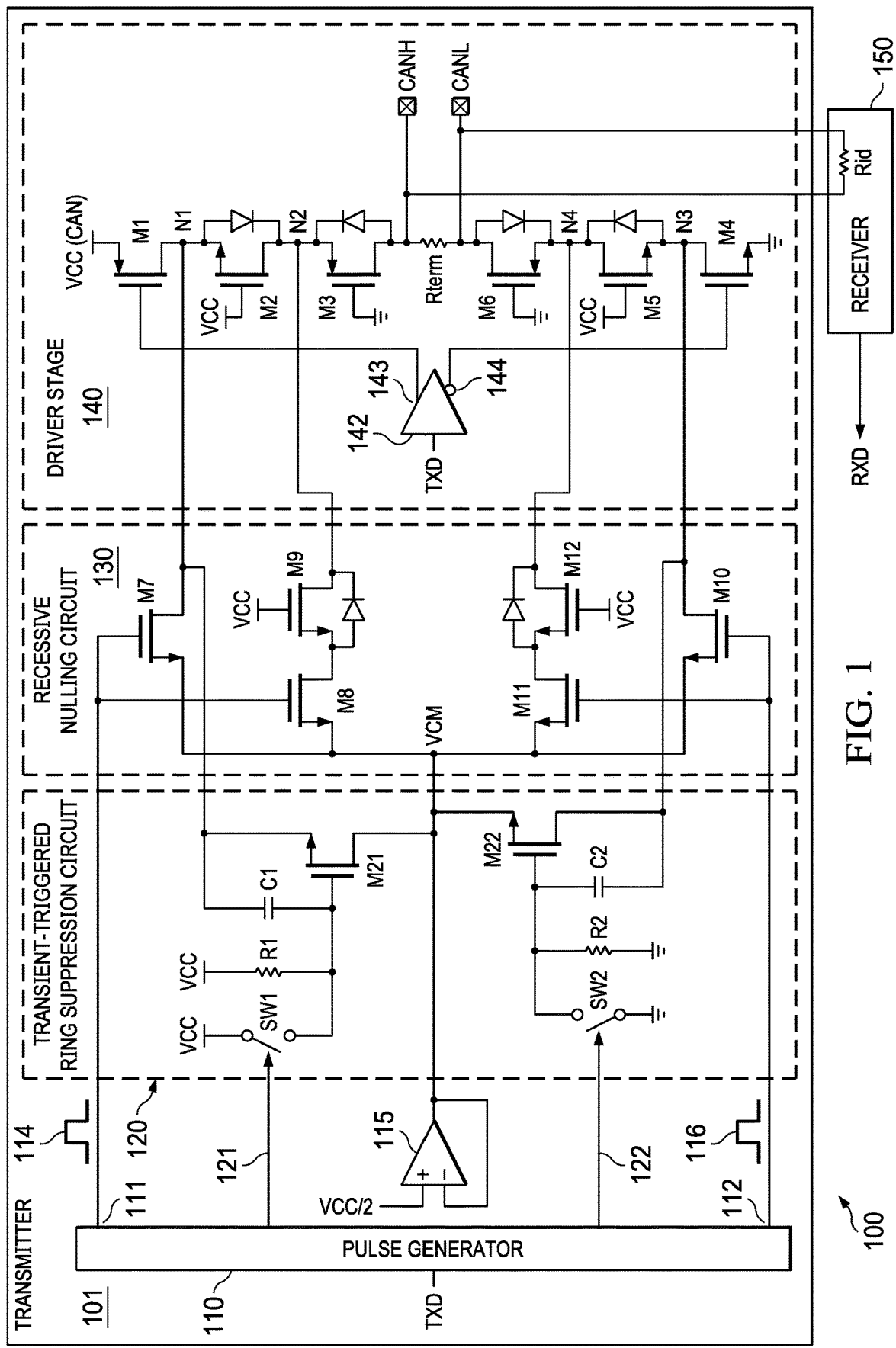
FIG. 1 shows an example of a CAN bus transceiver that includes a transient-triggered ring suppression circuit.

FIG. 1 shows an example of at least a portion of a CAN bus transceiver 100. The CAN bus transceiver 100 includes a transmitter 101 and a receiver 150. The CAN BUS terminals are shown as CANH and CANL. The receiver 150 is coupled to CANH and CANL and receives signals transmitted by another transceiver on the bus and outputs a receive signal, RxD, to other logic (not shown). Receiver 150 includes a differential resistance Rid between CANH and CANL. The transmitter 101 includes a pulse generator 110, a voltage buffer 115, a transient-triggered ring suppression circuit 120, a recessive nulling circuit 130, and a driver stage 140. The voltage buffer 115 produces a voltage equal to, in one example, one-half of the supply voltage on a common voltage terminal (VCM).

The driver stage 140 includes transistors M1-M6 and a driver 142. M1, M3, and M6 are p-type metal oxide semiconductor field effect transistors (PMOS) and M2, M4, and M5 are n-type metal oxide semiconductor field effect transistors (NMOS). As PMOS or NMOS devices, each such transistor includes a control input (gate) and current terminals (source and drain). Other types of transistors can be used as well, such as bipolar junction transistors, which also have control inputs (base) and current terminals (collector and emitter).

M1-M3 are connected in series between the supply voltage terminal (VCC) and CANH, with the source of M1 coupled to VCC, the drain of M1 connected to the source of M2 at node N1, the drain of M2 connected to the source of M3 at node N2, and CANH taken from the drain of M3. Similarly, M4-M6 are connected in series between ground and CANL, with the source of M4 coupled to ground, the drain of M4 connected to the source of M5 at node N3, the drain of M5 connected to the source of M6 at node N4, and CANL taken from the drain of M6. A termination resistor Rterm (e.g., 120 ohms) is connected between CANH and CANL, but the transceiver can be terminated in other ways as well (e.g., with a series-connected 60-ohm resistors between CANH and CANL and capacitor connected between the node between the resistors and ground).

The gates of PMOS transistors M3 and M6 are connected to ground and thus M3 and M4 remain on continuously. The sources of M3 and M6 remain fixed at the transistor's threshold voltage above ground (e.g., 0.7 V). M3 and M6 operate to block large negative voltages from the respective bus terminal CANH or CANL from damaging the transceiver. The gates of M2 and M5 are connected to VCC and block large positive voltages from the respective bus terminal CANH or CANL from damaging the transceiver.

The driver 142 receives the transmit signal TxD on its input and drives complementary outputs 143 and 144 which are connected to the gates of M1 and M4, respectively. CANH and CANL are either driven to the dominant state with CANH voltage being higher than the CANL voltage, or not driven and pulled by passive resistors to the recessive state with the CANH voltage being below or equal to the CANL voltage. A "0" data bit encodes the dominant state, while a "1" data bit encodes the recessive state. For the dominant state, TxD is set equal to 0 and for the recessive state, TxD is set equal to 1. With TxD being 0 (dominant state), output 143 of driver 142 is 0 (low) and output 144 is 1 (high). With output 143 being a 0 and output 144 being a 0, PMOS transistor M1 and NMOS transistor M4 are both turned on, thereby pulling CANH up towards VCC and CANL down toward ground. In accordance with the CAN bus protocol, in the dominant state the CAN bus differential voltage is nominally 2V. In the recessive state, TxD is a 1 and thus driver 142 output 143 is a 1 and output 144 is a 0 and both M1 and M4 are turned off. With M1 and M4 being off, the voltages on CANH and CANL passively become approximately equal to VCM through resistors Rterm and Rid. In the example provided above, VCM is equal to VCC/2. In an application in which VCC is 5V, VCM is 2.5V and, in the recessive state, CANH and CANL are both approximately equal to 2.5V (approximately zero differential voltage).

The recessive nulling circuit includes NMOS transistors M7-M12. The gates of M7 and M8 are connected together and to pulse generator 110. The drain of M7 is connected to the drain of M1 and source of M2 (node N1). M9 is connected between the drain of M8 and the drain of M2 and source of M3 (node N2). M9 is biased on and is operative to block large positive voltages on N2 from damaging the transceiver. The sources of M7 and M8 are connected together and to the sources of M10 and M11. The gates of M10 and M11 are connected together and to pulse generator 110. The drain of M10 is connected to the drain of M4 and to the source of M5 (node N3). M12 is connected between the drain of M11 and the drain of M5 and source of M6 (node N4). M12 is biased on and is operative to block large positive voltages on N4 from damaging the transceiver.

The pulse generator 110 generates pulses 114 and 116 on outputs 111 and 112, respectively, responsive to 0-to-1 transition of TxD. The width of the pulses can be fixed or programmable. In one example, the width is 200 nanoseconds. During the pulses, M7, M8, M10, and M11 are on. The recessive nulling circuit 130 functions to force each of nodes N1-N4 to be equal to VCM for a short period of time (e.g., 200 ns) upon transition into the recessive node to help force the voltages on CANH and CANL to be equal to each other and to VCM. Once the pulses 114 and 116 end, CAN and CANL remain at VCM.

The transient-triggered ring suppression circuit 120 helps to suppress ringing on the CAN bus upon the transition from the dominant state into the recessive state. The transient-triggered ring suppression circuit 120 includes switches SW1 and SW2, resistors R1 and R2, capacitors C1 and C2, and NMOS transistors M21 and M22. SW1 is coupled between VCC and the gate of M21. In one example, SW1 may be a PMOS transistor. R1 also is coupled between VCC and the gate of M21. C1 is coupled between the source and gate of M21. SW2 is coupled between ground and the gate of M22. In one example, SW may be an NMOS transistor. R2 also is coupled between ground and the gate of M22. C2 is coupled between the gate and drain of M21.

During the dominant state (TxD is 0), M1 is on. With M1 on, node N1 is pulled up to VCC and thus source of M21 is VCC. The source of M22 is coupled to VCM. During the dominant state, control signals 121 and 122 cause switches SW1 and SW2 to be closed. In this example, control signals 121 and 122 are generated by the pulse generator 110. If SW1 is implemented as a PMOS transistor, control signal 121 may be asserted by the pulse generator 110 to track the logic state of TXD (i.e., when TXD is high, control signal 121 is forced high, and vice versa). If SW2 is implemented as an NMOS transistor, control signal 122 may be asserted by the pulse generator 110 to track the logical inverse of the logic state of TXD (i.e., when TXD is high, control signal 122 is forced low, and vice versa). In one example, the pulse generator 110 includes a buffer to generate control signals 121 and 122 (the buffer having a positive and negative outputs). With SW1 closed, the gate of M21 is pulled up to VCC. As such, the gate-to-source voltage across M21 is insufficient to turn on M21 and thus M21 is off. With SW2 closed, the gate of M22 is pulled maintaining M22 in an off state.

Upon entry into the recessive state, control signals 121 and 122 change logic state and cause switches SW1 and SW2 to be open to thereby enable the transient-triggered ring suppression circuit. R1 pulls the gate of M21 high thereby maintaining M21 in an off state. However, any ringing signal on CANH propagates through M3 and M2 to capacitor C1. C1 becomes charged due to the ringing signal and if the magnitude of the ringing signal is large enough, C1 will charge to a sufficiently large voltage (at least a threshold voltage above VCM) to turn on M21. The resistor R1, which is connected between VCC and the gate of M21, discharges the gate of M21 thereby eventually turning of M21. As such, the ringing signal on CANH is dissipated through that portion of the transient-triggered ring suppression circuit 120 coupled to CANH (i.e., R1, C1, and M21).

In the recessive state and on the CANL side of the bus, R2 pulls the gate of M22 low thereby maintaining M22 in an off state. Any ringing signal on CANL propagates through M6 and M5 to capacitor C2. C2 becomes charged due to the ringing signal and if the magnitude of the ringing signal is large enough, C2 will charge to a sufficiently large voltage (at least a threshold voltage above M22's source which is connected to VCM) to turn on M22. The resistor R2, which is connected between ground and the gate of M22, discharges the gate of M22 thereby eventually turning of M22. As such, the ringing signal on CANL is dissipated through that portion of the transient-triggered ring suppression circuit 120 coupled to CANL (i.e., R2, C2, and M22).

Figure 2:
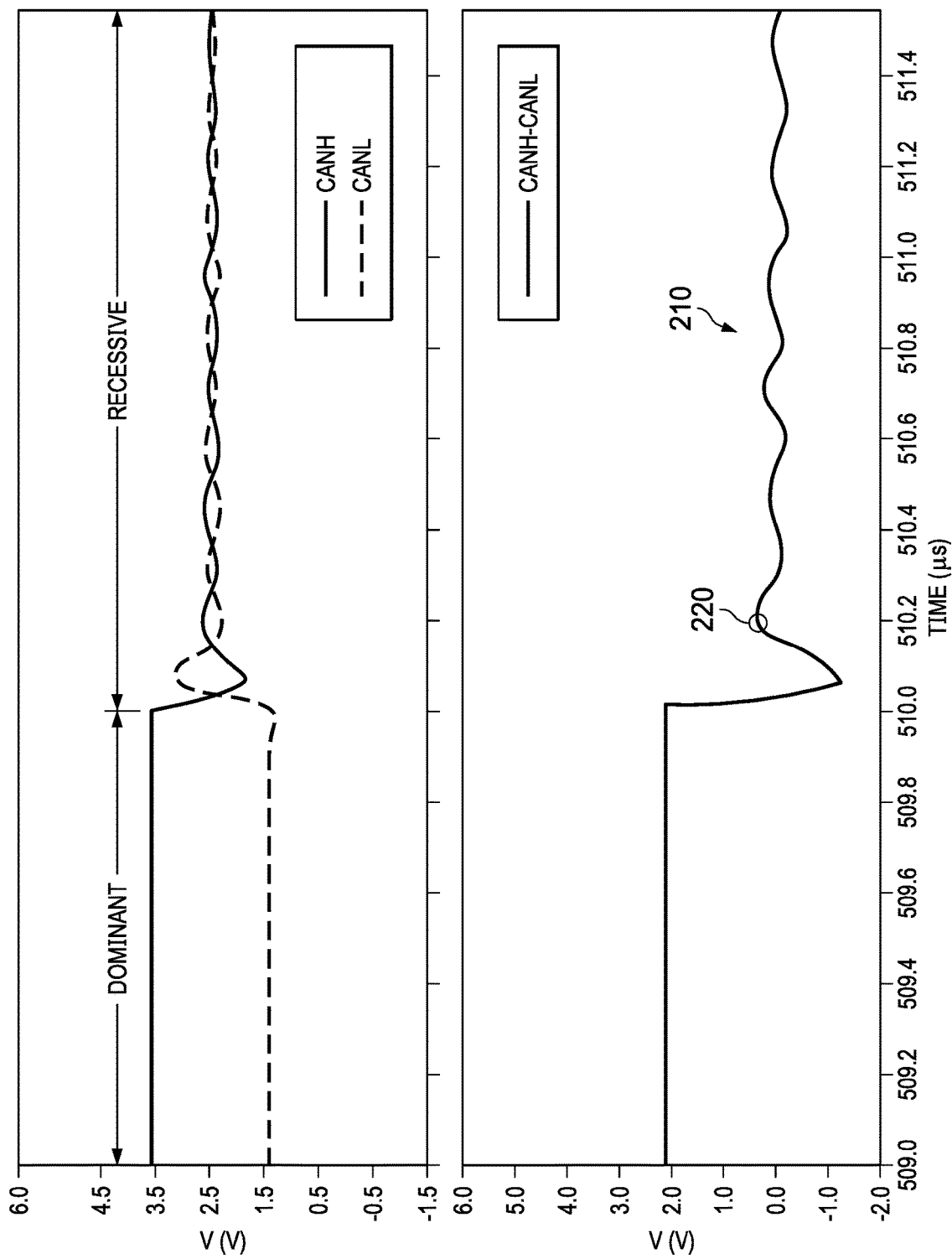
FIG. 2 shows an illustrative signal waveform of ringing on a CAN bus when the transceiver does not have a transient-triggered ring suppression circuit.

FIG. 2 illustrates voltage levels of CANH and CANL during the dominant state and upon transition into the recessive state for a CAN bus transceiver that does not have the transient-triggered ring suppression circuit 120. The upper curves show the CANH and CANL signals and the lower curve is the differential voltage (i.e., CANH-CANL). During the dominant state, CANH is 3.5V and CANL is 1.5V and thus differential voltage is 2V. Upon entry into the recessive state, CANH and CANL voltage levels are brought close together at approximately VCM, which is 2.5V in this example, However, in the example of FIG. 1, ringing 210 occurs upon entry into the recessive state. The ringing signal magnitude decreases over time. The initial ringing peak shown at 220 is high enough so as to cause a bit error in the transceiver (misinterpretation of ringing as a new dominant state).

Figure 3:
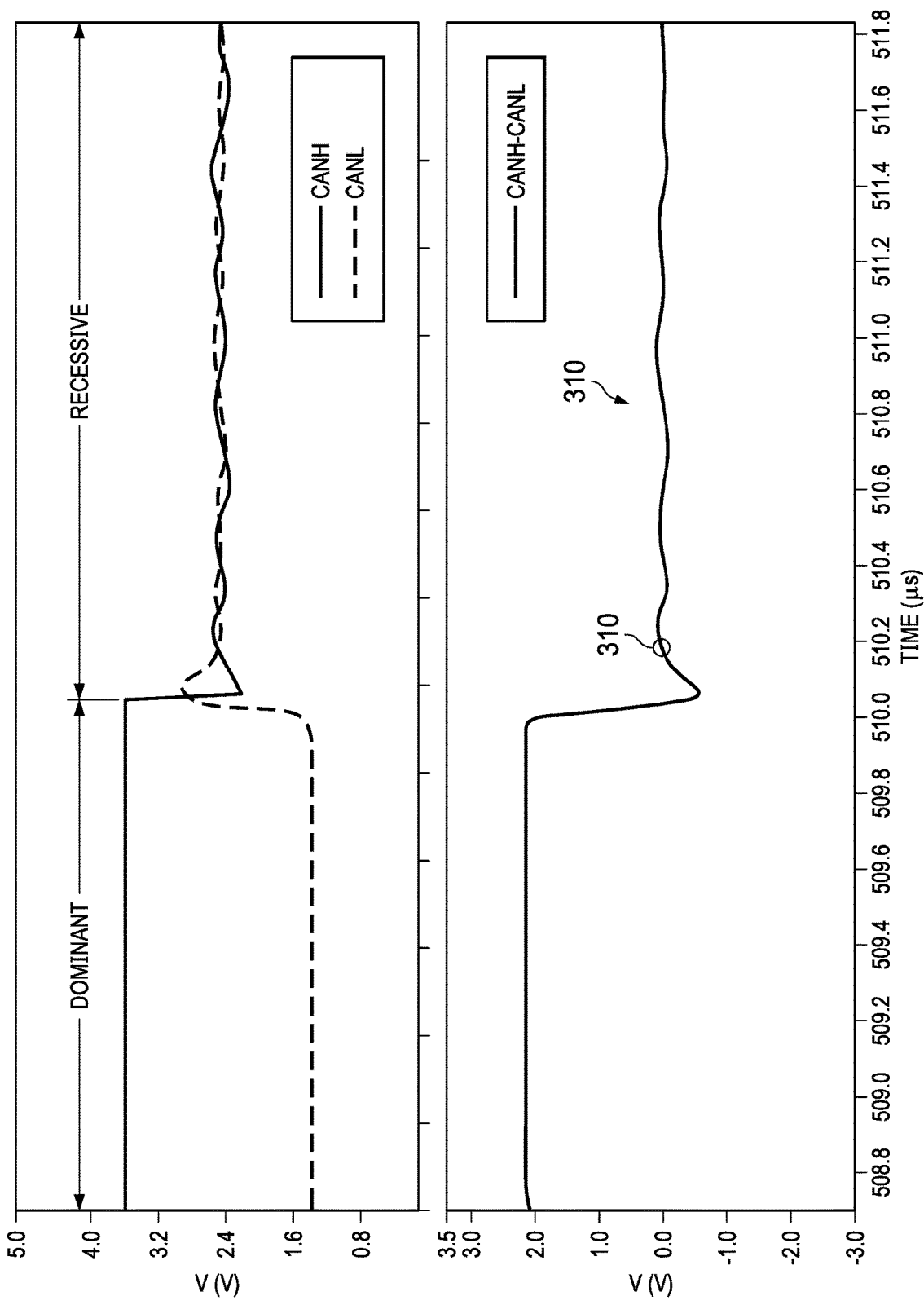
FIG. 3 shows an illustrative signal waveform illustrating attenuated ringing on a CAN bus for the transceiver of FIG. 1 which has a transient-triggered ring suppression circuit.

FIG. 3 illustrates CANH and CANL during the dominant state and upon transition into the recessive state for a CAN bus transceiver that has the transient-triggered ring suppression circuit 120 described above. As can be seen, the magnitude of the ringing 310 is attenuated compared to the ringing 210 in FIG. 2, and the peak ringing level 320 is not large enough to cause a bit error. Further, ringing 310 dissipates much more quickly than ringing 210.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A transceiver, comprising:
a driver stage having a first transistor coupled between a supply voltage terminal and a first bus terminal and a second transistor coupled between a ground and a second bus terminal;
a third transistor coupled between a common voltage terminal and a terminal of the first transistor, the first transistor having a control input and first and second current terminals;
a first capacitor coupled between the first current terminal and a control input of the third transistor;
a first resistor coupled between the supply voltage terminal and the control input of the third transistor; and
a first switch coupled between the supply voltage terminal and the control input of the third transistor.

2. The transceiver of claim 1, wherein a second switch is configured to be on during a first state of the transceiver, and off during a second state of the transceiver.

3. The transceiver of claim 2, wherein the transceiver is a controller area network (CAN) bus transceiver, and the first state is a dominant state and the second state is a recessive state.

4. The transceiver of claim 1, further including a voltage buffer having an output coupled to the common voltage terminal.

5. The transceiver of claim 1, further including:
a fourth transistor coupled between a terminal of the second transistor and the common voltage terminal, the fourth transistor having a control input and first and second current terminals;
a second capacitor coupled between the first current terminal of the fourth transistor and the control input of the fourth transistor;
a second resistor coupled between the ground and the control input of the fourth transistor; and
a second switch coupled between the ground and the control input of the fourth transistor.

6. The transceiver of claim 5, wherein the first transistor has a control input and the second transistor includes a control input, and the transceiver further includes a transmitter driver having a driver input, a first output, and a second output, the driver input configured to receive a transmit signal, the first output is coupled to the control input of the first transistor, and the second output is coupled to the control input of the second transistor.

7. The transceiver of claim 5, wherein:
the first switch is configured to be on during a first state of the transceiver, and off during a second state of the transceiver; and
the second switch is configured to be on during the first state of the transceiver, and off during the second state of the transceiver.

8. The transceiver of claim 7, wherein:
the transceiver is a controller area network (CAN) bus transceiver, and the first state is a dominant state and the second state is a recessive state; and
the transceiver includes a voltage buffer having an output providing the common voltage terminal.

9. The transceiver of claim 1, wherein the first transistor has a current terminal and the second transistor has a current terminal, and the transceiver further includes a recessive nulling circuit coupled to the common voltage terminal, the current terminal of the first transistor, and the current terminal of the second transistor, and the recessive nulling circuit is configured to force the current terminals of the first and second transistors to a voltage on the common voltage terminal for a period of time upon transition of the transceiver from a dominant state to a recessive state.

10. A transceiver, comprising:
a driver stage having a first transistor coupled between a supply voltage terminal and a first bus terminal and a second transistor coupled between a ground and a second bus terminal; and
a transient-triggered ring suppression circuit coupled to the first and second transistors, the transient-triggered ring suppression circuit is configured to be enabled upon transition of the transceiver from a dominant state to a recessive state and, while the transceiver is in the recessive state, to attenuate ringing on at least one of the first or second bus terminals;
wherein the transient-triggered ring suppression circuit includes:
a third transistor coupled between a terminal of the second transistor and a common voltage terminal, the third transistor having a control input and first and second current terminals;
a first capacitor coupled between the second current terminal of the third transistor and the control input of the third transistor;
a first resistor coupled between the ground and the control input of the third transistor; and
a first switch coupled between the ground and the control input of the third transistor.

11. The transceiver of claim 10, wherein the transient-triggered ring suppression circuit includes:
a fourth transistor coupled between a common voltage terminal and a terminal of the first transistor, the fourth transistor having a control input and first and second current terminals;
a second capacitor coupled between the first current terminal and the control input of the fourth transistor;
a second resistor coupled between the supply voltage terminal and the control input of the fourth transistor; and
a second switch coupled between the supply voltage terminal and the control input of the fourth transistor.

12. The transceiver of claim 10, wherein the first switch is configured to be on during the dominant state, and off the recessive state.

13. The transceiver of claim 10, further including a voltage buffer having an output coupled to the common voltage terminal.

14. A transceiver, comprising:
a driver stage having a first transistor coupled between a supply voltage terminal and a first bus terminal and a second transistor coupled between a ground and a second bus terminal; and
a transient-triggered ring suppression circuit coupled to the first and second transistors, the transient-triggered ring suppression circuit is configured to be enabled upon transition of the transceiver from a dominant state to a recessive state and, while the transceiver is in the recessive state, to attenuate ringing on at least one of the first or second bus terminals;
wherein the transient-triggered ring suppression circuit includes:

a third transistor coupled between a common voltage terminal and a terminal of the first transistor, the first transistor having a control input and first and second current terminals;
a first capacitor coupled between the first current terminal and the control input of the third transistor;
a first resistor coupled between the supply voltage terminal and the control input of the third transistor; and
a first switch coupled between the supply voltage terminal and the control input of the third transistor.

15. A transceiver, comprising:
a driver stage having a first transistor coupled between a supply voltage terminal and a first bus terminal and a second transistor coupled between a ground and a second bus terminal;
a third transistor coupled between a common voltage terminal and a terminal of the first transistor, the first transistor having a control input and first and second current terminals;
a first capacitor coupled between the first current terminal and the control input of the third transistor;
a first resistor coupled between the supply voltage terminal and the control input of the third transistor;
a first switch coupled between the supply voltage terminal and the control input of the third transistor;
a fourth transistor coupled between a terminal of the second transistor and the common voltage terminal, the fourth transistor having a control input and first and second current terminals;
a second capacitor coupled between the first current terminal of the fourth transistor and the control input of the fourth transistor;
a second resistor coupled between the ground and the control input of the fourth transistor; and
a second switch coupled between the ground and the control input of the fourth transistor.

16. The transceiver of claim 15, further including a voltage buffer having an output coupled to the second current terminals of the third and fourth transistors, the voltage buffer configured to generate a common voltage on the common voltage terminal.

17. The transceiver of claim 16, wherein the first transistor has a current terminal and the second transistor has a current terminal, and the transceiver further includes a recessive nulling circuit coupled to the common voltage terminal, the current terminal of the first transistor, and the current terminal of the second transistor, and the recessive nulling circuit is configured to force the current terminals of the first and second transistors to the common voltage terminal for a period of time upon transition of the transceiver from a first state to a second state.

18. The transceiver of claim 15, wherein the transceiver is a controller area network (CAN) bus transceiver.

* * * * *